United States Patent
Levy

(10) Patent No.: US 8,135,554 B1
(45) Date of Patent: Mar. 13, 2012

(54) PROBE CONFIGURATION DATA PROTOCOL AND TRANSMISSION METHOD

(76) Inventor: Jonathan A. Levy, Great Neck, NY (US)

( * ) Notice: Subject to any disclaimer, the term of this patent is extended or adjusted under 35 U.S.C. 154(b) by 0 days.

(21) Appl. No.: 13/134,832

(22) Filed: Jun. 17, 2011

Related U.S. Application Data

(63) Continuation of application No. 11/606,684, filed on Nov. 30, 2006, now abandoned, which is a continuation of application No. 11/042,773, filed on Jan. 24, 2005, now abandoned.

(60) Provisional application No. 60/538,875, filed on Jan. 23, 2004.

(51) Int. Cl.
*G01F 23/30* (2006.01)

(52) U.S. Cl. ........... 702/104; 702/47; 702/52; 73/290 V; 73/304 C; 73/319; 250/306; 375/219; 710/117; 710/45; 710/124; 370/205

(58) Field of Classification Search .................. 702/159, 702/158, 150, 97, 94, 47, 52, 104; 73/290 V, 73/304 C, 319; 250/227.21, 306; 375/219, 375/340, 342, 349, 358; 710/117, 45, 124, 710/20, 106, 25, 7, 23, 310, 52, 30, 33, 305; 370/205

See application file for complete search history.

(56) References Cited

U.S. PATENT DOCUMENTS

| | | | | |
|---|---|---|---|---|
| 3,627,946 A | * | 12/1971 | Inoue et al. | 370/540 |
| 5,324,315 A | * | 6/1994 | Grevious | 607/60 |
| 6,467,003 B1 | * | 10/2002 | Doerenberg et al. | 710/117 |
| 7,230,980 B2 | * | 6/2007 | Langford et al. | 375/219 |
| 2003/0193963 A1 | * | 10/2003 | Wright et al. | 370/442 |

\* cited by examiner

*Primary Examiner* — Carol Tsai
(74) *Attorney, Agent, or Firm* — Wechsler & Wechsler, P.C.; Lawrence I. Wechsler

(57) ABSTRACT

Transmission of probe configuration data is initiated upon recognition by the probe of a prescribed condition. Probe configuration data protocol includes a data frame, subdivided into a desired number of time slots. Unlike measurement data protocol, where inter-pulse pair timing within a slot varies based on a magnet position or temperature sensor resistance, configuration data protocol in accordance with the invention uses fixed inter-pulse timing to represent the various states of digital data. In such manner, at least a portion of the time slots making up the particular data frame can be used for containing data sent from the probe, and which can then be interpreted by the receiving processing device as at least one bit of binary code allocated to each individual slot of the portion of time slots.

20 Claims, 1 Drawing Sheet

PROBE CONFIGURATION DATA PROTOCOL AND TRANSMISSION METHOD

CROSS REFERENCE TO RELATED APPLICATIONS

This application is a continuation of application Ser. No. 11/606,684 filed Nov. 30, 2006 now abandoned entitled PROBE CONFIGURATION DATA PROTOCOL AND TRANSMISSION METHOD, which is in turn a continuation of application Ser. No. 11/042,773 filed Jan. 24, 2005 now abandoned entitled PROBE CONFIGURATION DATA PROTOCOL AND TRANSMISSION METHOD, which in turn claims the benefit of U.S. Provisional Application No. 60/538,875 filed Jan. 23, 2004 entitled PROBE CONFIGURATION DATA PROTOCOL.

BACKGROUND OF THE INVENTION

The present invention relates to transmission of probe-specific set up data in a probe adapted for use with an automatic tank gauge system, and in particular transmission of such data in connection with uni-directional probes which are output-only, generating continuous data regarding measured parameters.

Typically, uni-directional probes for measuring liquid levels, such as those which employ a well-known magnetostrictive linear position detector, send data to a processing unit via measurement data protocol which is defined by frames of data, subdivided into a plurality of slots. Each of these slots contain a reference pulse typically sent at a start of the slot, and a return pulse which lags the reference pulse by a particular timing which is representative of a parameter being measured. The inter-pulse timing, i.e., the period between the reference pulse and the return pulse is converted into the value of the measured parameter, such as for example, position of a magnet or temperature value, by the processing unit receiving the transmitted data from the probe.

Probes of this type generally include probe-specific data regarding structural configuration and characteristics unique to the particular probe. These include, for example, probe sensor length, wire speed, etc.

Conventionally, such data is included as printed matter carried on the probe, which data is input by a user into a processing system which receives and analyzes measurement data from the probe transmitted thereto in accordance with conventionally known probe measurement data protocol. When a probe is replaced, data entry is necessary for at least a portion of the characteristics which differ from the replaced probe and the one substituted therefor in order to assure accurate measurements based upon true characteristics peculiar to each unit. Failure to calibrate the tank gauge system upon probe replacement has heretofore presented a significant drawback, by resulting in subsequent gauging inaccuracies.

It is therefore an object of the invention to provide a method of transmitting probe configuration data which overcomes the drawbacks of the prior art, and by which such probe-specific data is transmitted to the tank gauge system processor, thereby obviating the heretofore requirement of manual entry.

SUMMARY OF THE INVENTION

In accordance with these and other objects of the invention, there is provided a method which sends data regarding the individualized probe characteristics (probe-specific set-up data) unique to a particular probe, referred to herein as "probe configuration data," including, for example, probe sensor length, wire speed, etc.

Briefly stated, transmission of the probe configuration data is initiated upon recognition by the probe of a prescribed condition indicated by one or more selected parameters, such as for example, the providing of continuous power to the probe for a period of time in excess of a normal duration experienced during the sending of measurement data by the probe and receipt of same by a remote processing device, advantageously carried out, for example, at powering-up of the system. Probe configuration data protocol in accordance with the invention includes a data frame, analogous in form to that used conventionally to send probe measurement data in accordance with probe measurement data protocol, the detailed description of which is omitted as being well known in the art but which is referred to briefly above. Each frame is subdivided into a desired number of time slots. Unlike the measurement data protocol, however, where inter-pulse pair timing within a slot varies based on a magnet position or temperature sensor resistance, configuration data protocol in accordance with the invention uses fixed inter-pulse timing to represent the various states of digital data. In such manner, at least a portion of the time slots making up the particular data frame can be used for containing data sent from the probe, and which can then be interpreted by the receiving processing device as at least one bit of binary code allocated to each individual slot of the portion of time slots.

In an alternative embodiment, rather than sending the probe configuration data via a dedicated probe configuration data protocol frame distinct from the probe measurement data protocol frame, as described above, instead at least one slot of the measurement frame used to send probe measurement data is used to represent configuration data in the same manner as each of the slots used for digital data transmission of the previously described embodiment. Using this approach, probe configuration data can be transmitted contemporaneously with transmission of the probe measurement data. By utilizing one or more slots of the probe measurement data protocol frame for configuration data, one bit or some small segment of the configuration data can be transmitted on every measurement data frame in a repeating sequence such that configuration data can be assembled after reception of a sequence of measurement frames, each which contains a fraction of the configuration data. A first frame in which configuration data is provided includes a marker, such as special data in one of the slots, to assure proper assembly of the configuration data segments (or individual bits of data).

In a preferred embodiment in accordance with the invention, transmission of the probe specific configuration data is effected using a particular probe configuration data protocol which utilizes the same time slot timing and relative position of the reference pulse in each of the slots selected to contain digital data as the corresponding prescribed probe measurement data protocol supporting conventional transmission of data while measurements are taken during active use of the probe.

The above, and other objects, features and advantages of the present invention will become apparent from the following description read in conjunction with the accompanying drawings.

DETAILED DESCRIPTION OF THE PREFERRED EMBODIMENT

Figure 1:
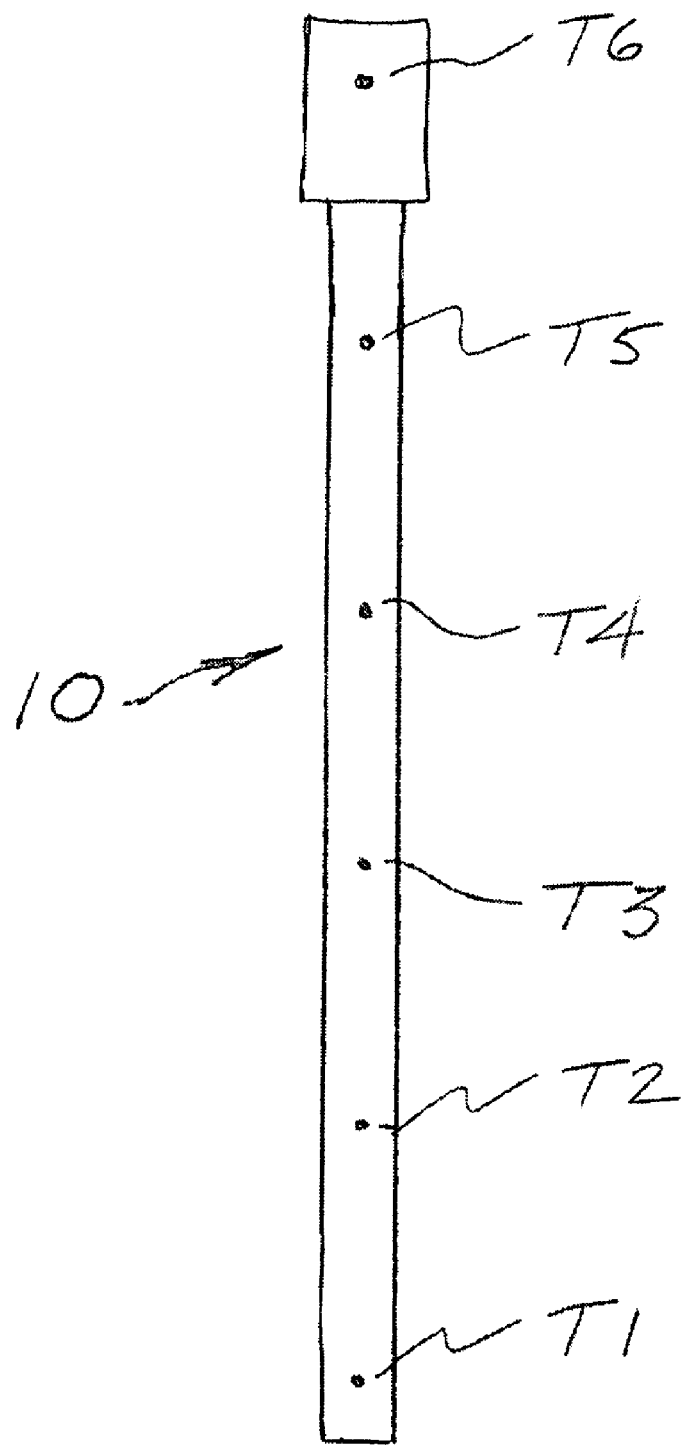
FIG. 1 is a schematic illustration of a conventional magnetostrictive liquid level measurement probe which omits depiction of the at least one magnet normally present during use.

The invention is intended to broadly embrace a method by which probe specific configuration data can be transmitted from the probe to a receiving device and a probe configuration data protocol by which such method can be implemented. In accordance with such method, transmission of the probe configuration data is initiated upon recognition by the probe of a prescribed condition indicated by one or more selected parameters, such as for example, the providing of continuous power to the probe for a period of time in excess of a normal duration experienced during the sending of measurement data by the probe and receipt of same by a remote device, advantageously carried out, for example, at system power-up.

To carry out the method of transmission in accordance with the invention, probe configuration data protocol is defined, and which includes a data frame, analogous in form to that used conventionally to send probe measurement data in accordance with probe measurement data protocol, the detailed description of which is omitted as being well known in the art, but which is referred to briefly above. Each "frame," defined herein as a time based string of data, is subdivided into a desired number of time "slots". However, unlike the measurement data protocol, where inter-pulse pair timing (i.e., the delay time between the reference pulse and a subsequent return pulse) within a slot varies based on the particular value of the measured parameter, for example, a magnet position or temperature sensor resistance, configuration data protocol in accordance with the invention uses fixed inter-pulse timing to represent the various states of digital data. In this regard, in order to represent n number of digital states, a slot intended to contain data is divided into n+1 number of sub-slots. A fixed return pulse can then be allocated, as representing a particular digital state, to an end of each sub-slot, with the exception of the last sub-slot in time (since this will interfere with the reference pulse of a subsequent slot, where it is positioned at the start of the slot), and will represent a predefined digital state. For example, if only two digital states (i.e., 0 or 1) were required to be represented in a particular slot, such as for example in transmission of binary data, the slot would be divided into three sub-slots (n+1 where n=2). One of the states which is either "0" or "1" is then allocated to a pulse appearing at a timing which lags the reference pulse at the start of the slot by ⅓ of the total time slot interval, and a remaining one of the states to a pulse appearing at a timing which lags the reference pulse at the start of the slot by ⅔ of the total time slot interval.

In such manner, at least a portion of the time slots making up the particular data frame can be used for containing data sent from the probe, and which can then be interpreted by the receiving device as at least one bit of binary code allocated to each individual slot of the portion of time slots.

A preferred embodiment will now be described by way of example, with reference to FIG. 1, in which a magnetostrictive probe of conventional design is schematically depicted, and generally designated 10. One or more temperature sensors (six in the depicted example, identified respectively by the numerals designators 1-6) are generally disposed along a length of the probe to measure and transmit signals representative of a local temperature at a given position along the probe, and which corresponds to a particular height, when disposed vertically in use.

For purposes of disclosure, the invention will be described in specific relation to the particular example of one type of conventional measurement data protocol. It will, however, be understood that many alternative data protocols may already be in conventional use or developed in the future, and the invention is contemplated to apply by analogy to any such various protocols which differ in the precise manner in which data is transmitted uni-directionally from probe to processing unit.

In accordance with the known example, probe measurement data protocol formats a data stream by dividing a frame (i.e., a string of data sent for a prescribed time period) of data into 16 discrete time slots, in which a time slot quiet (or "sync interval") is followed by 15 time slot data pulse-pair intervals. The purpose for the sync interval is to permit a distinction to be ascertained by the processing device between a frame and a previously or subsequently transmitted frame.

Table 1 below provides a comparison between the probe measurement protocol (conventional example) and configuration data protocol according to the preferred embodiment the invention as applicable to the particular selected measurement protocol example, and in which T1-T6 are the data slots corresponding to temperature sensors 1-6, TL and TH are respectively high and low temperature P1-P6 are product level data and W is water level data.

TABLE 1

| Frame Data: | | |
|---|---|---|
| Slot | Measurement | Configuration |
| 1 | Sync Interval | Sync Interval |
| 2 | T1 | LSB Data |
| 3 | W | 2SB Data |
| 4 | T2 | 3SB Data |
| 5 | P1 | 4SB Data |
| 6 | T3 | 5SB Data |
| 7 | P2 | 6SB Data |
| 8 | T4 | 7SB Data |
| 9 | P3 | 8SB Data |
| 10 | T5 | 9SB Data |
| 11 | P4 | 10SB Data |
| 12 | T6 (Head) | MSB Data |
| 13 | P5 | Parity Bit (Even) |
| 14 | TL (Low Ref) | Bit = 0 |
| 15 | P6 | Bit = Frame Index |
| 16 | TH (High Ref) | Bit = 1 |

As will be apparent from Table 1, in accordance with the described example to which the table applies, slot 1 is used as a sync interval in the same manner as is practiced in accordance with the corresponding conventional probe measurement data protocol. Slots 2-12 are selected for containing data to be transmitted. Remaining slots 13-16 are optionally used as safeguards against inaccurate data transmission. As can be seen from the table, slot 13 contains a parity bit, the purpose of which, for use in checking whether data has been accurately transmitted, is well known. To further insure that data being sent is not measurement data, but rather intended as probe configuration data, slots 14 and 16, correspond to slot positions allocated to data representative of high and low reference temperatures (TL and TH time slot positions) of the measurement data protocol example. TL and TH time slot positions (slots 14 and 16) contain fixed "0" and "1" values, respectively. These time slots serve as markers to insure that configuration data is not interpreted as measurement data, since in measurement mode, TL is always much greater that TH. Slot 15 contains data serving as a frame index, which is explained below.

Depending upon how many frames are to follow one another in a frame sequence, a slot 15 (or any other slot selected to serve the purpose of a frame index) is divided into m+1 sub-slots, where m is the number of frames in a particular frame sequence. The digital state of the slot can then be incremented, much in the manner of the digital data frames as described above, to signify the number of a particular frame in the frame sequence. For example, if the protocol is to allow 8 frames to be sent in sequence, is divided into 9 sub-slots. Assuming a 4.5 ms time slot, return pulses measured relative to the reference pulse at the start of the slot would lag the reference pulse by 0.5 ms, 1.0 ms, 1.5 ms, 2.0 ms, and so on, up to 4.0 ms, and 1-8 digital states would each be allocated to a corresponding one of these pulses. Conveniently, of course, such allocation would simply be, though not necessarily, such that frame index number 1 would be represented by the 0.5 ms timed pulse interval, frame index number 2 would be represented by the 1.0 ms timed pulse interval, etc., the value of each frame index being thus allocated in sequential order corresponding to the length of the respective return pulse lag times.

In an alternative embodiment, rather than sending the probe configuration data via a dedicated probe configuration data protocol frame distinct from the probe measurement data protocol frame, as described above, instead a portion of the slots (one or more slots) of the frame used to send measurement data is used to represent configuration data in the same manner as each of the slots used for digital data transmission of the previously described embodiment, i.e., utilizing fixed inter-pulse timing to represent the various states of digital data. Using this approach, probe configuration data can be transmitted contemporaneously with transmission of the probe measurement data. By utilizing one or more slots of the probe measurement data protocol frame for configuration data, one bit or some small segment of the configuration data can be transmitted on every measurement data frame in a repeating sequence such that configuration data can be assembled (pieced together) after reception of a sequence of measurement frames each which contains a fraction of the configuration data. To enable recognition of a first frame in which configuration data is included, such that when assembled, the data segments will result in meaningful configuration data, the first frame includes a marker, such as for example, a slot which contains of data having a special value different from data ordinarily encountered in frame transmission, or having data set in the measurement frame to an invalid state.

It is noted that alternative nomenclature has been used in the prior art to identify time-based relationships analogous with the "frames" and "slots" referred to herein. For example, in U.S. Pat. No. 5,253,521 issued to Abramovich et al., incorporated herein by reference as pertaining to the transmission of probe measurement data, the "frames" referred to herein as identifying a time based string of data is referred to in the alternative as a "series" or "sequence" of measurement values, and the "slots" herein defined as the time periods collectively comprising the string of data are referred to in the alternative as time "frames" or "periods". One skilled in the art will understand the above defined relationships between the various terms described herein notwithstanding the use of such alternative nomenclature.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention.

What is claimed is:

1. A method of transmitting probe configuration data, comprising:
   providing a frame comprising a time based string of data, said frame being subdivided into slots of predetermined duration;
   utilizing sub-slots with fixed inter-pulse timing within at least one of the slots within the frame to represent at least one of various states of digital data; and
   transmitting said probe configuration data at least partially represented in said at least one of the slots, a particular one of said at least one of various states of digital data being represented by a respective time interval location of said fixed inter-pulse timing within said at least one of the slots.

2. A method according to claim 1, wherein said frame contains both measurement data and at least a portion of the probe configuration data.

3. A method according to claim 1, wherein one of said slots within said frame is representative of measurement data.

4. A method according to claim 3, further comprising:
   initiating said providing upon recognition by a probe of a prescribed condition.

5. A method according to claim 4, wherein said prescribed condition includes providing of continuous power to the probe for a period of time in excess of a normal duration experienced during sending of the measurement data by the probe.

6. A method according to claim 4, wherein said initiating is carried out at a system power-up.

7. A method according to claim 1, wherein, to represent n number of digital states, said at least one of the slots is divided into n+1 number of sub-slots.

8. A data protocol, comprising:
   a frame comprising a time based string of data, said frame being subdivided into slots of predetermined duration; and
   at least one slot of said slots being divided into sub-slots comprised of fixed inter-pulse timing which are each used to represent a particular state of digital data, the particular state of digital data being represented by a respective time interval location of said fixed inter-pulse timing within said at least one slot.

9. A data protocol according to claim 8, wherein:
   said at least one of various states is representative of probe configuration data; and
   said frame contains both measurement data and at least a portion of the probe configuration data.

10. A data protocol according to claim 8, wherein:
    said at least one of various states is representative of probe configuration data; and
    none of said slots within said frame is representative of measurement data.

11. A data protocol according to claim 10, wherein said frame contains at least one marker to insure that configuration data is not interpreted as measurement data.

12. A method of transmitting data, comprising:
    providing a frame comprising a time based string of data, said frame being subdivided into slots of predetermined duration;
    utilizing sub-slots with fixed inter-pulse timing within at least one of the slots within the frame to represent at least one of various states of digital data; and transmitting said data at least partially in said at least one of the slots, a particular one of said at least one of various states of digital data being represented by a respective time interval location of said fixed inter-pulse timing within said at least one of the slots.

13. A method according to claim 12, wherein:
said at least one of various states is representative of probe configuration data; and
said frame contains both measurement data and at least a portion of the probe configuration data.

14. A method according to claim 12, wherein:
said at least one of various states is representative of probe configuration data; and
none of said slots within said frame is representative of measurement data.

15. A method according to claim 14, further comprising:
initiating said providing upon recognition by a probe of a prescribed condition.

16. A method according to claim 15, wherein said prescribed condition includes providing of continuous power to the probe for a period of time in excess of a normal duration experienced during sending of the measurement data by the probe.

17. A method according to claim 15, wherein said initiating is carried out at a system power-up.

18. A method according to claim 12, wherein, to represent n number of digital states, said at least one of the slots is divided into n+1 number of sub-slots.

19. A method of representing data, comprising:
providing at least one slot of known duration;
dividing each of said at least one slot into sub-slots each defining a known time interval within said known duration; and
identifying a discrete state of digital data by noting a pulse appearing at a location corresponding to a start of a particular said known time interval.

20. A system for use in conjunction with a measurement probe for transmission of probe-specific set-up data, the system comprising:
a probe structurally configured to output data in a form of at least one slot of predetermined duration, said at least one slot being divided into n+1 sub-slots each of a known time interval, wherein n represents a number of digital states, said data being represented by a pulse being output at a start of a particular one of said n+1 sub-slots; and
a measurement device configured to receive said data and to recognize position of said pulse at the start of said particular one of said n+1 time slots.

* * * * *